United States Patent Office 3,544,475
Patented Dec. 1, 1970

3,544,475
DETERGENT COMPOSITIONS BASED ON MIXTURES OF ALPHA-OLEFIN SULFONATES AND DIMER OLEFIN SULFONATES
Shinichi Tomiyama, Ichikawa-shi, Akira Mori and Masuzo Nagayama, Tokyo, Masayasu Takao, Funabashi-shi, and Hitoshi Sekiguchi, Tokyo, Japan, assignors to Lion Fat & Oil Co., Ltd., Tokyo, Japan, a corporation of Japan
No Drawing. Filed Sept. 20, 1968, Ser. No. 761,281
Claims priority, application Japan, Sept. 29, 1967, 42/62,301
Int. Cl. C11d 1/14, 3/65
U.S. Cl. 252—161                                         1 Claim

ABSTRACT OF THE DISCLOSURE

A powdered or granular detergent composition, superior in controlled suds and free-flow characteritsics, containing the active ingredients consisting of 50 to 97 percent by weight of sodium α-olefine sulfonates having from about 12 to about 20 carbon atoms, and 3 to 50 percent by weight of sodium sulfonates of the compounds having a general formula of

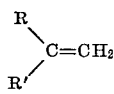

wherein R and R' are alkyl groups and the total carbon atoms are between about 10 to about 20 is disclosed.

BACKGROUND OF THE INVENTION

Field of the invention

The present invention relates to a powdered or granular detergent composition which comprises essentially of α-olefine sulfonates having substantially from 12 to 20 carbon atoms and sulfonates of the compounds having a general formula of

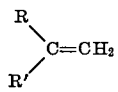

wherein R and R' are alkyl groups and the total carbon atoms are substantially from 10 to 20.

Description of the prior art

The detergents which mainly composed of alkylbenzene sulfonate (ABS) are used as household products, because of its markedly superior foaming power and detergency. ABS, however, is not easily degraded by microorganisms, has high foaming power at low concentration, is highly permeable, and has some irritation to skin.

From these points, the detergents which have excellent quality of ABS and have not its defects are desired, and α-olefine sulfonate has been noticed. The α-olefine sulfonate are usually made by sulfonation of α-olefine mixtures having 12–20 carbon atoms, which may contain a small quantity of hydrocarbons other than α-olefins, using gaseous sulfur trioxide, followed by neutralization and hydrolysis of the reaction products. The α-olefine sulfonates have excellent detergency, free-flow property in granular form and biodegradability. But in the presence of oily soils, they are somewhat inferior in detergency than ABS and their foaming power at low concentrations is as high as ABS, that is, they have not good controlled suds property. Any substances which improve the controlled-suds property of α-olefine sulfonates have been unknown, so α-olefine sulfonates should be very excellent compounds for household detergents when these substances of the above mentioned could be discovered.

Other than the said α-olefines, there are vinylidene compounds having the general formula of

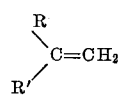

so-called "dimer olefines," which are produced from ethylene, propylene and so on. We had interest so much in the properties of the sulfonates of these compounds having 10–20 carbon atoms, and so we prepared their sulfonates and tested their properties. Of course, such dimer olefine sulfonates are new compounds and their properties have been unknown.

As the results of our tests, it became clear that the sulfonates of the compounds having a general formula of

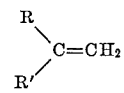

(total carbon number=10–20) markedly improved the controlled suds property without lowering the properties of free-flowing and detergency, when they were added to α-olefine sulfonates in the definite amount, and their detergency in the presence of oily soils were better than α-olefine sulfonates only.

SUMMARY OF THE INVENTION

It is an object of the present invention to provide a granular detergent composition superior in controlled suds and free-flow characteristics, containing active ingredients consisting of 50% to 97%, preferably 70% to 95%, of α-olefine sulfonates having about 12 to 20 carbon atoms and 3% to 50%, preferably 5% to 30%, of sulfonates of the compounds having a general formula of

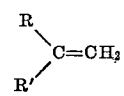

wherein R and R' are alkyl groups and have about 10 to 20 carbon atoms. This detergent composition may also contain usual detergent builders such as polyphosphates, carbonates and so on, and, if needed, may contain a small amount of other surfactants or additives.

α-Olefines used as a raw material for α-olefine sulfonates in the present invention, may be the one having single chain length carbon number, such as fractionated product of α-olefines made by Ziegler process, or a mixture having different carbon chains such as waxcracking olefines. Usually α-olefines are commercially sulfonated with gaseous sulfur trioxide diluted with inert gas by using thin-film sulfonator, and the reaction products are neutralized with caustic alkali (usually sodium hydroxide) and then hydrolyzed to obtain sulfonates.

In the present invention, the said dimer olefines may be derived either way from single carbon olefine or different carbon olefines, but the said dimer olefine should contain above vinylidene compounds as its major component. To sulfonate these compounds both batch and continuous process can be used, but it is commerically desirable to use the same method as in the case of α-olefine sulfonates, because a large amount of disulfonates and some by-products are produced in the batch process.

DESCRIPTION OF THE PREFERRED EMBODIMENTS

Example 1

Heavy duty granular detergent: Wt. percent
- (1) Na-α-olefine sulfonate (made from wax-cracking α-olefine having 15–18 carbon atoms) ⎫
- (2) Na dimer olefine sulfonate (made from dimer olefine having 16 carbon atoms) ⎭ 20
- (3) Sodium tripolyphosphate _____ 40
- (4) Na silicate _____ 3
- (5) Sodium carbonate _____ 5
- (6) CMC _____ 2
- (7) Sodium sulfate _____ Balance Of the above compositions, components 1 and 2 were varied as described in the next table. The detergent products were spray-dried by a disc-type dryer, and tested the foam height at the concentration of 0.2% and 0.02% and free-flow properties.

The test methods used are as follows:

(1) Foaming height was measured according to Ross Miles method, at 25° C., after 1 min.

(2) Free-flow test:
 (a) Preparation of the test samples.—The detergents to be tested were packed in the ordinal carton, and kept in a weathering room adjusted to 85% relative humidity and 35° C. for 24 hours.
 (b) Measuring of free-flowing.—After opening the top of the carton, the detergents were flowed down through the out-let by gravity or slight shock with inclining the carton, and then the condition of flowing detergent was observed.
 (c) Evaluation of the flowing condition.

| Score | Condition |
|---|---|
| 10 | Flow continuously. |
| 8 | Flow well, but stop twice or three times. |
| 6 | Flow intermittently. |
| 5 | Not flow down, but after one shock full, detergent flow down by gravity. |

| | Na-α-olefine sulfonate | Na-dimer olefine sulfonate | Foam height, (mm.) 0.2% | 0.02% | Free-flowing score [1] |
|---|---|---|---|---|---|
| Control | 100 | 0 | 185 | 72 | 10 |
| Sample No.: | | | | | |
| 1 | 97 | 3 | 183 | 44 | 10 |
| 2 | 96 | 5 | 182 | 21 | 10 |
| 3 | 90 | 10 | 184 | 18 | 10 |
| 4 | 80 | 20 | 181 | 16 | 10 |
| 5 | 70 | 30 | 182 | 15 | 10 |
| 6 | 50 | 50 | 183 | 16 | 8 |
| Control | 30 | 70 | 184 | 14 | 5 |

[1] See table below:
NOTE.—Consideration.
1. Foam height in all the samples were nearly equal at concentration of 0.2%, but at 0.02% the foam height of the detergent containing Na-dimer olefine sulfonate decreased.
2. Free-flow property didn't change when the content of dimer olefine sulfonate were up to 30%, but tended to be inferior with increasing content, so the amount can be added may be less than 50%.

EXAMPLE 2

Light duty granular detergent: Wt. percent
- (1) Na-α-olefine sulfonate (made from Ziegler α-olefine having mainly 16 carbon atoms) ⎫
- (2) Na-dimer olefine sulfonate (made from dimer olefine having 12–16 carbon atoms) ⎭ 20
- (3) Na-lauryl sulfate _____ 5
- (4) Sodium sulfate _____ Balance Of the above compositions, components 1 and 2 were varied as Example 1 described before and tested the foam height and free-flow property and further the detergency in the presence of oily soils. To test the detergency, every dish was soiled with 2.5 g. of shortening oil, then washed with the detergent solution (0.25%). The number of washed dishes until the area covered with the foam decreased to 50% of the surface was described below.

| | Na-α-olefine sulfonate | Na-dimer olefine sulfonate | Detergency in the presence of oily soil washed dishes | Foam height (mm.) 0.2% | 0.02% | Free flowing, score |
|---|---|---|---|---|---|---|
| Control | 100 | 0 | 12 | 191 | 68 | 10 |
| Sample No.: | | | | | | |
| 1 | 97 | 3 | 19 | 193 | 33 | 10 |
| 2 | 95 | 5 | 22 | 191 | 18 | 10 |
| 3 | 90 | 10 | 23 | 191 | 17 | 10 |
| 4 | 80 | 20 | 23 | 189 | 15 | 10 |
| 5 | 70 | 30 | 25 | 188 | 14 | 10 |
| 6 | 50 | 50 | 29 | 190 | 14 | 8 |
| Control | 30 | 70 | 32 | 191 | 13 | 5 |

NOTE.—consideration.
1. Dimer olefine sulfonate has excellent detergency to oily soils.
2. Controlled sudsing property is nearly equal with increase of DOS (dimer olefine sulfonate) content.
3. Free-flow property is as similar as in the case of Example 1.

We claim:
1. A detergent composition consisting essentially of from 50 to 97 percent by weight of sodium α-olefine sulfonates having from about 12 to 20 carbon atoms and from 3 to 50 percent by weight of sodium sulfonates of compounds of the formula

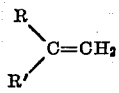

wherein R and R' are alkyl groups and the total carbon atoms are from about 10 to 20.

References Cited

UNITED STATES PATENTS 3,444,087 5/1969 Eccles et al. _____ 252—138
2,695,327 11/1954 Ziegler et al. _____ 260—683.15

LEON D. ROSDOL, Primary Examiner

D. L. ALBRECHT, Assistant Examiner

U.S. Cl. X.R.

252—121, 138; 260—513